No. 872,540.
PATENTED DEC. 3, 1907.
W. G. PRICE.
SLACK ADJUSTER FOR CAR BRAKES.
APPLICATION FILED AUG. 18, 1906.
2 SHEETS—SHEET 1.
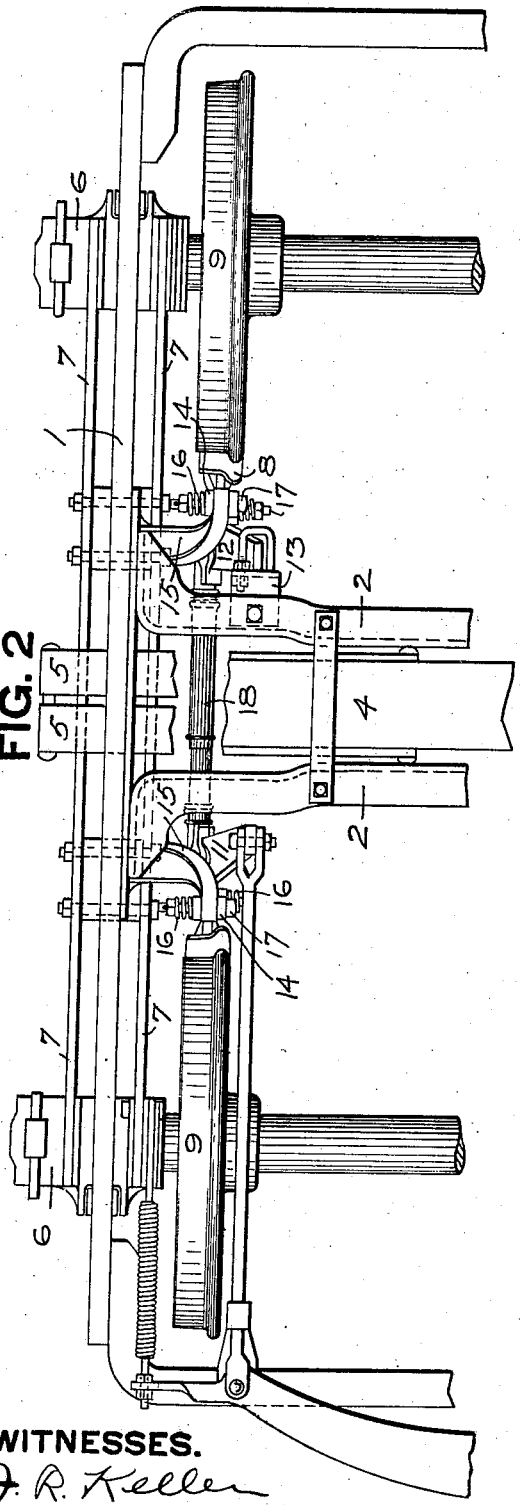
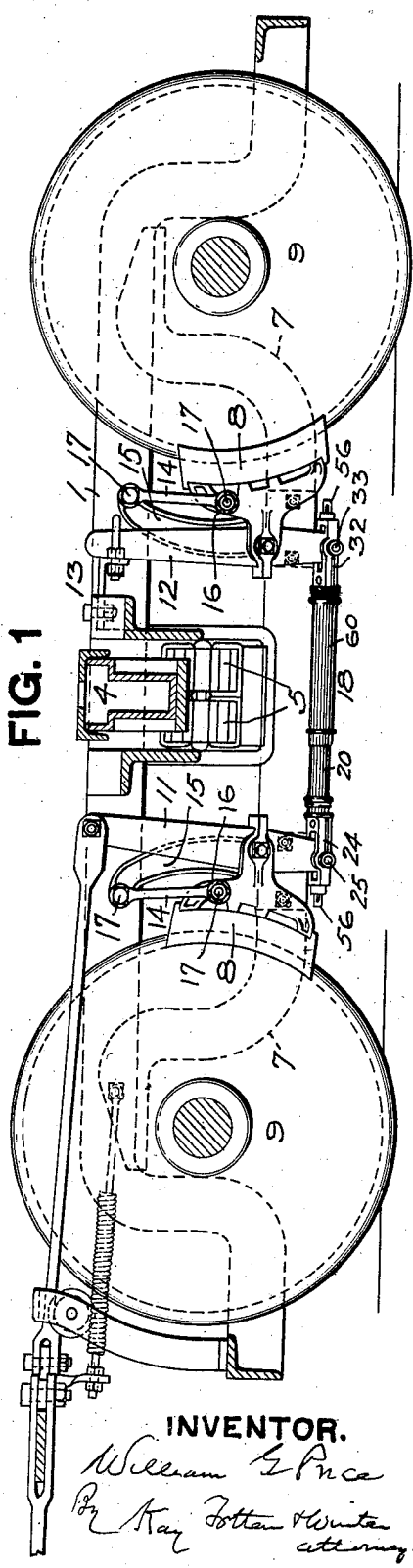
WITNESSES.
INVENTOR.

No. 872,540.
PATENTED DEC. 3, 1907.
W. G. PRICE.
SLACK ADJUSTER FOR CAR BRAKES.
APPLICATION FILED AUG. 18, 1906.
2 SHEETS—SHEET 2.
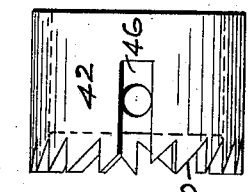
FIG. 7
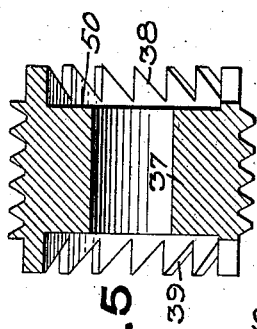
FIG. 5
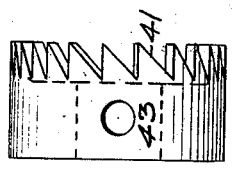
FIG. 6
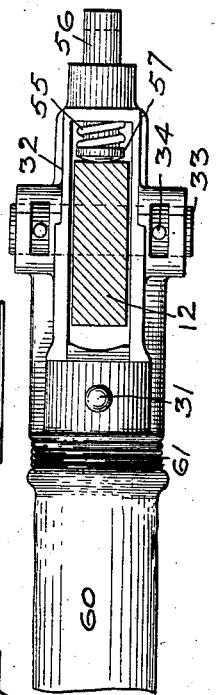
FIG. 3
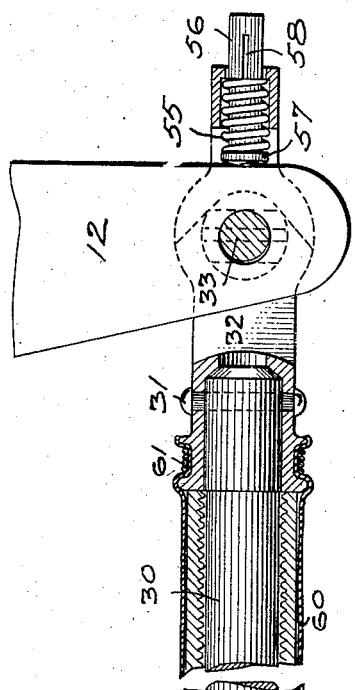
FIG. 4
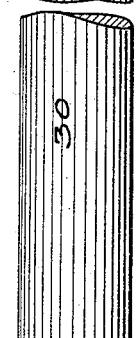
FIG. 8
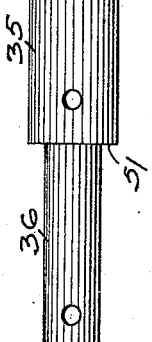
WITNESSES.
J. R. Keller
Robert C. Totten
INVENTOR.
William G. Price
By Key Totten & Winter
Attorneys

UNITED STATES PATENT OFFICE.

WILLIAM G. PRICE, OF NEW CASTLE, PENNSYLVANIA.

SLACK-ADJUSTER FOR CAR-BRAKES.

No. 872,540.  Specification of Letters Patent.  Patented Dec. 3, 1907.

Application filed August 18, 1906. Serial No. 331,140.

*To all whom it may concern:*

Be it known that I, WILLIAM G. PRICE, a resident of New Castle, in the county of Lawrence and State of Pennsylvania, have invented a new and useful Improvement in Slack-Adjusters for Car-Brakes; and I do hereby declare the following to be a full, clear, and exact description thereof.

This invention relates to slack adjusters for railway car trucks, and more especially for motor trucks.

The object of the invention is to provide automatically operating mechanism for taking up the slack in the brake mechanism due to the wearing away of the brake shoes and other causes, so as to preserve a uniform stroke for the brake cylinder piston or other mechanism for actuating the brake mechanism.

The invention comprises an automatic turn-buckle located preferably in the bottom brake rod, as hereinafter described and claimed.

In the accompanying drawings Figure 1 is a longitudinal section of a truck showing my invention applied thereto; Fig. 2 is a plan view of a portion of the truck; Fig. 3 is a plan view of the turn-buckle; Fig. 4 is an enlarged sectional view taken through the turn-buckle and showing the lower ends of the live and dead levers; Figs. 5, 6 and 7 are enlarged sectional views of the screw block and ratchet collars; and Fig. 8 is a side view of the piston or rod.

In the drawings the invention has been shown applied to an electric motor truck, but obviously it can be applied to any kind of truck or standard form of brake mechanism. The truck shown has side frames 1 connected by transoms 2 between which is located the swing bolster 4 supported on springs 5. The wheel journal boxes 6 bear against the equalizer bars 7, as is well known in that type of trucks. The brake shoes are shown at 8 located between the wheels 9, said brake shoes being shown without brake beams, though they may be connected to brake beams. The live lever of the brake mechanism is shown at 11 and is pivotally connected to one of the brake shoes 8, while the dead lever 12 is connected to the other brake shoe and to a bracket 13 on one of the transoms of the truck frame. The brake shoes are supported by hangers 14 depending from brackets 15 secured to the equalizer bars or other part of the truck frame.

In order to momentarily or temporarily hold the brake beams in their expanded or spread position, that is, when moved toward the wheels of the truck, I provide suitable frictional means, such as the springs 16 surrounding the pivot bolts 17 which connect the brake beam hangers and the brackets 15, these springs being of sufficient strength to prevent the brake beams from immediately falling away from the wheels, thus giving the automatic slack adjuster time to operate.

The parts so far described are, or may be, of any usual or desired construction. My invention is applied to a connecting rod 18 at the lower ends of the live and dead levers. It comprises, essentially, an automatically operating turn-buckle in said bottom connecting rod. This turn-buckle comprises an outer tube or sleeve member 20 threaded internally as shown, and having one end thereof secured to the live lever 11. This connection is made by providing an end member 21 having a threaded fit in one end of the tube or sleeve 20 and having suitably secured thereto, such as by means of a rivet 23, a jaw member 24 which is connected to the live lever 11 by a pin 25. The end member 21 is fastened in the sleeve 20 by a tap bolt 26, the hole for which intersects a counter-bored hole 27 in the inner end of the member 21, so that by removing the tap bolt 26 oil can be introduced into the interior of the turn-buckle. The bolt 25 is held against displacement by means of a cotter pin 28.

Projecting into the tube or sleeve member 20 is a rod or piston 30 which has secured to its outer end by any suitable means, such as the rivet 31, a jaw member 32 which in turn is connected to the dead lever 12 by a pin 33 held against displacement by a cotter pin 34 or other suitable means. This rod or piston 30 near its inner end has a reduced portion 35 and beyond the same a still smaller portion 36. Loosely surrounding the portion 36 of this rod is a screw block 37 having threads formed on its outer face which engage the threads on the interior of the tube or sleeve member 20 and with a sufficiently loose fit so that said screw block can be readily rotated. This screw block forms the anchor or abutment for the rod or piston 30, as will hereinafter appear, and is automatically rotated so as to change its position in the tube or sleeve member 20 in order to take up the slack. This automatic adjustment is effected by suitable ratchet mechanism between the rod 30 and said screw block. As shown, this ratchet mechanism comprises ratchet teeth 38 and 39 formed respectively on the two opposite ends of the screw block 37 and coöperating ratchet teeth 40 and 41 formed respectively on collars or sleeves 42 and 43 mounted on the rod or piston 30. The sleeve 42 is mounted on the reduced portion 35 of the rod 30 and has a slight sliding movement thereon. It is secured to said rod so that it cannot rotate, by means of a pin or bolt 44 having an elongated head 45 fitting in a slot 46 arranged longitudinally of the sleeve, so that said pin prevents the rotation of the sleeve on the rod but permits longitudinal movement thereon. A safety spring 47 is arranged between a shoulder 48 on the rod or piston 30 and the outer end of the sleeve 42 and acts normally to press said sleeve toward the screw block 37 as far as the pin 44 permits. The collar or sleeve 43 is fixed to the outer end of the rod or piston 30 by means of a pin 49. The screw block 37 has its end provided with a recess 50 which is adapted in the operation of the device to bear against the shoulder 51 formed on the rod or piston 30 by the reduced portion 36. The ratchet teeth on the two ends of the screw block 37 are in line with each other, while the teeth on the sleeves or collars 42 or 43 are out of line with each other the distance of one half the width of a tooth.

The operation of the device is as follows: When the brakes are applied the piston or rod 30 is pushed inwardly in the tube or sleeve member 20 and the teeth 40 on the sleeve 42 engage the teeth 38 on the screw block 37 and the continued inward movement of the rod or piston 30 revolves the screw block until the teeth of the two members are closed and in line with each other, in which position the shoulder 51 of the rod or piston 30 presses against the countersunk surface 50 in the screw block and the latter prevents the rod or piston from moving farther into the said tube or sleeve 20, so that said screw block forms an abutment for the rod 30. When the brakes are released the friction springs 16 on the pivots 17 of the brake beam hangers tend to temporarily hold the brake beams in their outermost or spread position and the movement of the live lever 11 therefore pulls the tube or sleeve 20 away from the piston or rod 30, thereby causing the teeth 41 on the sleeve or collar 43 on said rod to come into contact with the teeth 39 on the opposite end of the screw block 37, and as the teeth on the sleeves 43 and 42 are out of line with each other and spaced apart a distance equal to one-half the width of a tooth while the two ends of the screw block 37 are in line with each other, the further pressure of the sleeve member 43 causes the screw block 37 to be rotated the distance of one-half of the width of a tooth. When the brakes are again applied the teeth 38 on the opposite end of the screw block 37 are one half a tooth out of line with the teeth on the sleeve 42, so that the inward movement of said sleeve 42 again revolves the screw block 37 the distance of a half width of a tooth. This action continues until the brake shoes are so close to the wheels that the piston or rod 30 on the release of the brakes is not pulled out of the tube or sleeve 20 sufficiently far to cause the teeth on the sleeve 43 to contact with the teeth 39 on the screw block 37, and consequently said screw block will not be further rotated. The normal distance between the ends of the teeth on the sleeve 43 and those on the screw block 37 is about one-fourth of the depth of the teeth, and consequently said teeth are prevented from engaging at a time when the slack is not yet all taken up, so that the wheels can push the brake shoes away far enough to clear the same. In case the points of the teeth 38 on the screw block 37 should strike the points of the teeth on the sleeve 42 so that these teeth would not come together, the spring 47 permits the sleeve 42 to move outwardly and thus protects the teeth from being broken.

In order to prevent lost motion or slack between the live and dead levers and the jaw members of the turn-buckle, I provide suitable spring mechanism between said levers and the jaw members, said spring mechanism being shown as spiral springs 55 surrounding bolts 56 guided in the outer ends of the jaw members and provided with heads 57 which are pressed by the springs 55 against the levers, thus pressing said levers firmly against the pins connecting the same to the jaws, and also pressing the pins firmly against the openings in the jaws themselves. Consequently, there is no slack or lost motion at these points. The bolts 56 are provided with slots 58 through which wedges 59 may be driven in order to compress the springs 55 when assembling the parts.

In order to prevent moisture or dirt getting into the open end of the tube member 20 I surround said member by a sleeve 60 formed of some flexible water proof material, and secure one end of said member to the jaw member 32, as for instance by wrapping the same with wire 61. The opposite end of said sleeve is held against the tube member 20, preferably by means of an elastic band 63.

The slack adjuster described is entirely automatic in its operation, is of simple construction and occupies so little space that it is not materially larger than the bottom connecting rod 18.

What I claim is:

1. In a slack adjuster, the combination of brake applying mechanism, a turn-buckle in said mechanism, and a ratchet in said turn-buckle arranged to rotate one element of said turn-buckle when force is applied to the turn buckle.

2. In brake mechanism, the combination of shoes, means for spreading the same apart, frictional means for momentarily holding said shoes apart, a turn-buckle connecting said shoes, and a ratchet in said turn-buckle arranged to expand the same when force is applied to the turn-buckle.

3. In a slack adjuster, the combination of brake applying mechanism, and a turn-buckle in said mechanism, said turn-buckle having an internally threaded member, a screw working therein, and a member reciprocating longitudinally of the turn buckle and arranged on its reciprocation to rotate said screw.

4. In a slack adjuster, the combination of brake applying mechanism, a turn buckle in said mechanism, said turn buckle having an internally threaded member, a screw working therein, and a member reciprocating longitudinally of the turn buckle and projecting into the internally threaded member and guided thereby and arranged on its reciprocation to rotate said screw.

5. In a slack adjuster, the combination of brake applying mechanism, and a turn buckle in said mechanism, said turn buckle having an internally threaded member, a screw working therein, and a reciprocating rod forming one member of the turn buckle and arranged on its reciprocation to rotate said screw.

6. In a slack adjuster, the combination of brake applying mechanism, a turn-buckle in said mechanism, said turn-buckle comprising two elements having a threaded connection, a member having a connection to the brake mechanism and moving therewith, and a ratchet carried by said member and arranged on the movement of said member to rotate one of the elements of the turn-buckle.

7. In a slack adjuster, the combination of brake applying mechanism, a turn-buckle in said mechanism, said turn-buckle comprising two members having a threaded connection, one being connected to the brake mechanism and the other having a ratchet, a member also having connection to the brake mechanism and arranged in its movements to engage the ratchet on one of the threaded members and rotate the same.

8. In a slack adjuster, the combination of brake applying mechanism, a turn-buckle in said mechanism, said turn-buckle comprising members having a threaded connection, one of said members being connected to the brake mechanism, a reciprocating member also connected to the brake mechanism, and ratchet mechanism between said reciprocating member and the other of the threaded members to rotate the latter.

9. In a slack adjuster, the combination of brake applying mechanism, a turn-buckle in said mechanism, said turn-buckle having two members having a threaded connection with each other, one of said members being connected to the brake mechanism, a reciprocating member also connected to the brake mechanism and coöperating with the other threaded member and being resisted in its movements by the latter, and ratchet mechanism between said last named threaded member and reciprocating member, whereby the reciprocation of the latter member rotates the other member.

10. A turn-buckle having an internally threaded member, a screw block working therein, and a reciprocating member coöperating with the screw block and arranged on its reciprocation to rotate the same.

11. A turn-buckle comprising an internally threaded member, a reciprocating member therein, a screw block working in the internally threaded member and forming an abutment for the reciprocating member, and ratchet mechanism between said screw block and reciprocating member.

12. A turn-buckle having an internally threaded member, a reciprocating member therein, a screw block in the internally threaded member and serving as an abutment for the reciprocating member, said screw block being provided on opposite faces with ratchet members, and coöperating ratchet members carried by the reciprocating member.

13. A turn-buckle comprising an internally threaded member, a reciprocating member therein, a screw block working in the internally threaded member and provided on opposite end faces with ratchet teeth, and coöperating oppositely facing ratchet teeth on the reciprocating member, the ratchet teeth on one of the screw block or reciprocating member being out of line.

14. A turn-buckle comprising an internally threaded tube, a reciprocating rod therein, a screw block coöperating with the tube and provided with ratchet teeth on its opposite end faces, said teeth being in line with each other, and members on the reciprocating rod on opposite sides of the screw block and provided with ratchet teeth for engaging the teeth of the screw block, the distance between the ratchet teeth on the reciprocating member being greater than the length of the screw block.

15. A turn-buckle comprising an internally threaded tube, a reciprocating rod therein, a screw block surrounding the end of the rod and engaging the internally threaded tube and provided on its ends with ratchet teeth, collars on the reciprocating rod on opposite sides of the screw block and provided with coöperating ratchet teeth, one of said collars being slidable on the rod, and a spring for normally holding said sleeve toward the screw block.

16. In brake mechanism, the combination of live and dead levers, a bottom brake rod connected to the levers by pin and jaw connections, and springs arranged to take up lost motion between the levers, jaws and pins.

17. In brake mechanism, the combination of live and dead levers, a bottom brake rod connected to the levers by pin and jaw connections, and springs arranged between the jaws and levers for taking up lost motion.

18. A slack adjuster comprising an automatic turn-buckle and a water resisting flexible sleeve covering the same.

19. A turn-buckle comprising an internally threaded member, a rod entering the same, and a flexible sleeve secured to the protruding end of the rod and covering the turn-buckle.

20. A slack adjuster including an automatic turn-buckle comprising a threaded tube, a rod entering said tube, a flexible sleeve surrounding the tube and having one end secured to the protruding end of the rod, and a flexible band securing the opposite end of the sleeve to the tube.

In testimony whereof, I, the said WILLIAM G. PRICE, have hereunto set my hand.

WILLIAM G. PRICE.

Witnesses:
M. D. VOGEL,
F. W. WINTER.